United States Patent [19]
Murakami et al.

[11] Patent Number: 5,656,894
[45] Date of Patent: Aug. 12, 1997

[54] HORIZONTAL RASTER WIDTH CONTROLLING APPARATUS

[75] Inventors: Yasuo Murakami; Kazuyuki Iimura; Kenji Ano, all of Nagasaki, Japan

[73] Assignee: Mitsubishi Denki Kabushiki Kaisha, Tokyo, Japan

[21] Appl. No.: 543,074

[22] Filed: Oct. 13, 1995

[30] Foreign Application Priority Data

Jun. 26, 1995 [JP] Japan ............... 7-159474

[51] Int. Cl.⁶ .................................... H01J 29/56
[52] U.S. Cl. .................................. 315/371; 348/806
[58] Field of Search ......................... 315/371, 411, 315/367; 348/806

[56]     References Cited

U.S. PATENT DOCUMENTS 5,323,092  6/1994  Helfrich et al. ............... 315/371
5,434,484  7/1995  Murakai ....................... 315/371

FOREIGN PATENT DOCUMENTS

63-286071  11/1988  Japan .
 4-82480   3/1992  Japan .
 4-160874  6/1992  Japan .

Primary Examiner—Theodore M. Blum
Attorney, Agent, or Firm—Burns, Doane, Swecker & Mathis, LLP

[57] ABSTRACT

The difference signal indicating a difference between the output of the horizontal deflection circuit unit and a desired horizontal raster signal is converted into a digital signal corresponding to the difference signal by the A/D converter. The converted digital signal is outputted to the digital signal processor. The digital signal processor performs a feedback control of raster width by digital operations. The digital signal processor outputs the result signal of the operation to the D/A converter where the result signal is converted into an analog result signal. The analog signal is sent to the horizontal deflection circuit unit where the power to be supplied to the deflection yoke is controlled.

21 Claims, 11 Drawing Sheets

HORIZONTAL RASTER WIDTH CONTROLLING APPARATUS

BACKGROUND OF THE INVENTION

1. Field of the Invention

This invention relates to a horizontal raster width control apparatus which controls a horizontal raster width of a display apparatus equipped with a Cathode Ray Tube (CRT).

2. Description of the Related Art

Figure 16:
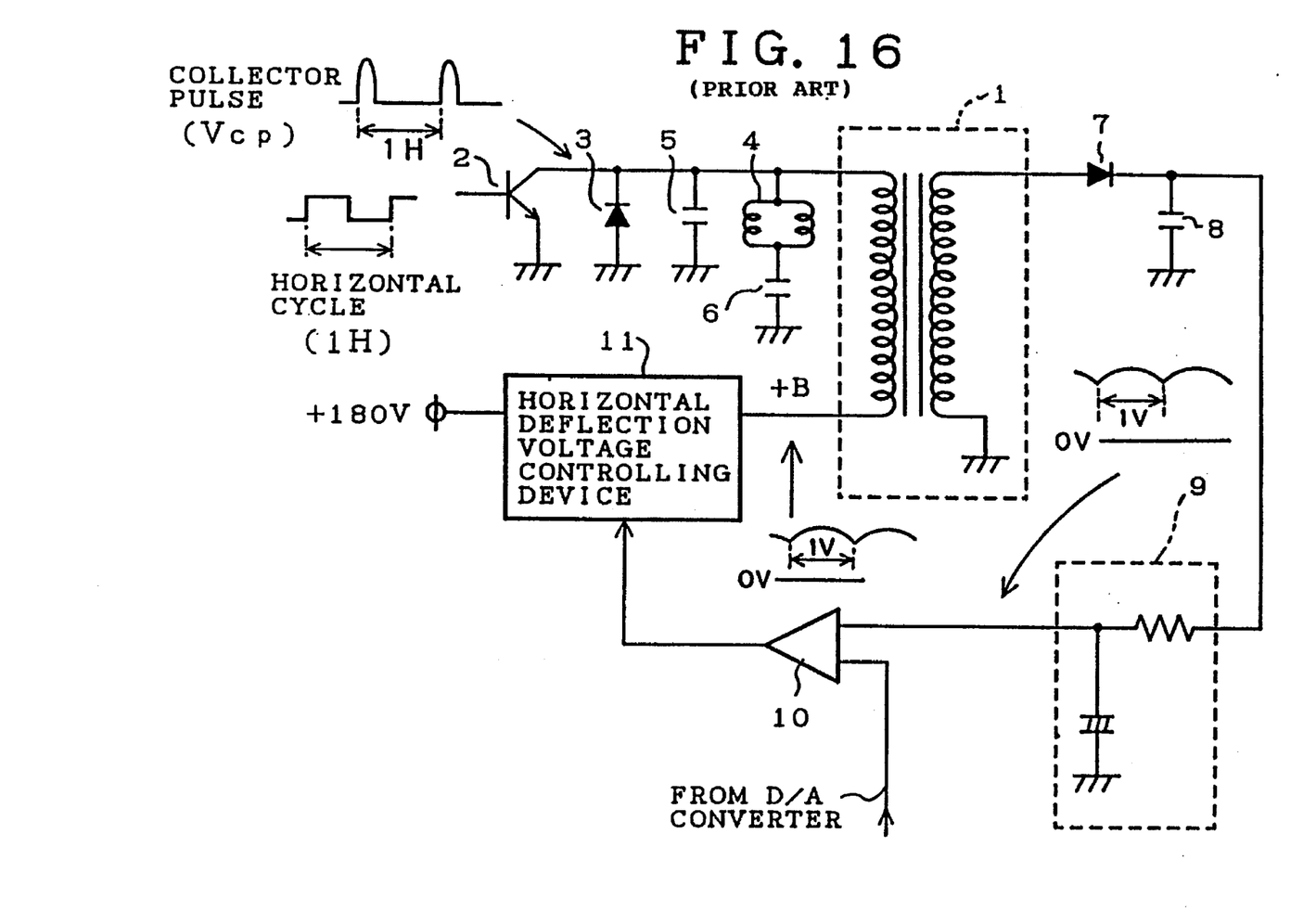
FIG. 16 is a block diagram showing a configuration of a conventional horizontal raster width controlling apparatus.

FIG. 16 is a block diagram showing a configuration of a conventional horizontal raster width controlling apparatus. In the figure, reference numeral 1 denotes a horizontal output choke transformer, 2 denotes a horizontal output transistor, 3 denotes a dumper diode, 4 denotes a deflection yoke of a CRT, 5 denotes a capacitor which makes resonance with the deflection yoke 4, 6 denotes a capacitor for supplying supplemental energy for resonance, 7 denotes a diode rectifying an output voltage of a secondary winding of the horizontal output choke transformer 1, 8 denotes a capacitor for smoothing, 9 denotes a low pass filter removing ripples of the rectified and smoothed voltage with the diode 7 and the capacitor 8, 10 denotes a differential amplifier which outputs a signal indicating a difference between a horizontal raster width control signal from a D/A converter (which is not shown in the figure) and a raster width feedback signal outputted from the low pass filter 9, 11 denotes a horizontal deflection voltage control apparatus which controls an output voltage thereof according to an output signal from the differential amplifier 10.

Electric power for horizontal deflection is supplied to the deflection yoke 4 by the horizontal output transistor 2, dumper diode 3 and capacitors 5 and 6. The quantity of deflection current flowing through the deflection yoke 4 is controlled based on electric power supplied from the primary winding of the transformer 1. Namely, horizontal raster width is controlled according to a voltage outputted from the horizontal deflection voltage control device 11.

Further, the collector pulse voltage $V_{CP}$ applied to the collector of the transistor 2 increases in proportion to an increase in horizontal deflection current flowing through the deflection yoke 4. Therefore, the voltage rectified and smoothed by the diode 7 and capacitor 8 indicates a value of current flowing through the deflection yoke 4, i.e., horizontal deflection width. The voltage signal rectified and smoothed by the diode 7 and the capacitor 8 is inputted to the low pass filter 9 where frequency components higher than a predetermined frequency are attenuated. The voltage signal filtered by the low pass filter 9 is inputted to one of the input terminals of differential amplifier 10. A control destination value subject to correction of distortion of raster width in a vertical direction is inputted to the other input terminal of the differential amplifier 10 from a D/A converter (not shown). The difference signal between these input signals is produced by the differential amplifier 10 and feedback control of horizontal raster width is realized by varying the voltage +B outputted from the horizontal deflection voltage control device 11 to be applied to the horizontal output choke transformer 1 according to the difference signal.

The conventional horizontal raster width controlling apparatus is configured as explained above and it is very difficult to preset cutoff frequency of the low pass filter 9 because the parabolic modulation in a vertical synchronizing period for correcting the pincushion distortion is superimposed on the signal of the feedback system. Further, when a horizontal frequency is changed among a plurality of frequencies, or when system is in a transient state such as when the power of the apparatus is turned on or off, high voltage is applied to the horizontal output transistor 2 thereby the transistor has a lot of stress.

SUMMARY OF THE INVENTION

In view of the above, a horizontal raster width of the present invention is accomplished in order to eliminate the problems explained above. Therefore, the object of the present invention is to obtain a horizontal raster width controlling apparatus which can control a horizontal width of a raster displayed on a screen without being affected by the pincushion correction responsively to a horizontal frequency change. Another object of the invention is to obtain a horizontal raster width controlling apparatus which can reduce stress which would be applied to the horizontal output transistor.

In order to realize the above objects, a horizontal raster width controlling apparatus of this invention is so configured that it comprises: a deflection yoke for deflecting an electron beam emitted from the cathode ray tube; horizontal deflection voltage controlling means for controlling a power voltage to be applied to the deflection yoke based on a control signal inputted from an outside of the horizontal deflection voltage controlling means and for outputting the power voltage; a horizontal output transistor for applying a voltage to the deflection yoke based on the power voltage outputted from the horizontal deflection voltage controlling means at a timing of horizontal synchronizing signal; voltage measuring means for measuring a first signal corresponding to a collector pulse to be applied to the horizontal output transistor and for outputting the first signal; means for producing an analog difference signal indicating a difference between the first signal and a second signal indicating a desired horizontal width of the raster; analog-to-digital converting means for converting the analog difference signal into a digital difference signal; digital processing means for inputting the digital difference signal, for performing a feedback operational processing so as to control a horizontal width of the raster based on the digital difference signal, and for outputting a digital resultant signal indicating a result of the feedback operational processing; digital-to-analog converting means for converting the digital resultant signal into an analog resultant signal; and voltage control signal generating means for generating the control signal based on the analog resultant signal and for outputting the control signal to the horizontal deflection voltage controlling means. With this configuration, controlling of a horizontal raster width can be precisely performed.

Further, a horizontal raster width controlling apparatus of this invention is so configured that the analog-to-digital signal converting means samples and holds the analog difference signal at a timing of a vertical synchronizing signal. With this configuration, controlling of a horizontal raster width can be performed without being affected by a raster distortion correction in each vertical cycle.

Further, a horizontal raster width controlling apparatus of this invention is so configured that the horizontal raster width controlling apparatus further comprises: raster width inputting means for inputting a desired horizontal raster width; and raster width signal generating means for generating the second signal based on the inputted desired horizontal raster width. With this configuration, controlling of a horizontal raster width can be performed based on a horizontal raster width a user desires.

Further, a horizontal raster width controlling apparatus of this invention is so configured that the digital signal processing means performs the feedback operational processing such that the digital difference outputted from the analog-to-digital converting means settles into a predetermined digital convergence value when the feedback operational processing is in a state of convergence. With this configuration, controlling of a horizontal raster width can be precisely performed.

Further, a horizontal raster width controlling apparatus of this invention is so configured that the digital signal processing means performs a first feedback operational processing a predetermined number of times immediately after a power of the apparatus is turned on, and thereafter the digital signal processing means performs a second operational processing repeatedly, a control speed of the first feedback operational processing being higher than a control speed of the second feedback operational processing. With this configuration, even when the display apparatus is in a transient state immediately after the power is turned on or after a horizontal frequency is changed, a horizontal raster width can be precisely and stably performed.

Further, a horizontal raster width controlling apparatus of this invention is so configured that in the first feedback operational processing, possible values of the digital difference signal outputted from the analog-to-digital converting means are divided into a plurality of ranges on a basis of the digital convergence value and that the digital signal processing means performs a first feedback operational processing a controlling speed of which is dependent on a range in which a value of the digital difference signal is included. With this configuration, even when the display apparatus is in a transient state immediately after the power is turned on or after a horizontal frequency is changed, a horizontal raster width can be precisely and stably performed.

Further, a horizontal raster width controlling apparatus of this invention is so configured that the horizontal raster width controlling apparatus further comprises corrective wave signal generating means for generating a corrective wave signal for correcting horizontal raster widths in each vertical period and signal adding means for adding the corrective wave signal to the analog resultant signal outputted from the digital-to-analog converting means, and that the voltage controlling signal generating means generates the control signal for controlling the power voltage based on a signal outputted from the signal adding means and outputs the control signal to horizontal deflection voltage controlling means. With this configuration, a horizontal raster width can be changed at a timing of vertical synchronizing signal cycle without affecting feedback controlling of a horizontal raster width.

Further, a horizontal raster width controlling apparatus of this invention is so configured that the corrective wave signal generating means stops generating the corrective wave signal immediately after a horizontal synchronizing frequency is changed and outputs a predetermined constant voltage signal instead of the corrective wave signal such that a voltage value outputted from the horizontal deflection voltage controlling means becomes lower. With this configuration, instability of the controlling of a horizontal raster width immediately after a horizontal synchronizing frequency is changed can be prevented thereby stress to a horizontal output transistor can be reduced.

Further, a horizontal raster width controlling apparatus of this invention is so configured that the digital signal processing means outputs such digital data to the digital-to-analog converting means that a voltage value outputted from the horizontal deflection voltage controlling means becomes lower for a predetermined period of time after a power of the apparatus is turned on or after a horizontal synchronizing frequency is changed. With this configuration, instability of the controlling of a horizontal raster width immediately after a horizontal synchronizing frequency is changed or the power in turned on can be prevented thereby stress to a horizontal output transistor can be reduced.

Further, a horizontal raster width controlling apparatus of this invention is so configured that the feedback operational processing includes a horizontal synchronizing frequency as a parameter such that a control change due to a horizontal synchronizing frequency difference is absorbed. With this configuration, controlling of a horizontal raster width can be precisely and stably performed even if a frequency of a horizontal synchronizing frequency is changed.

Further, a horizontal raster width controlling apparatus of this invention is so configured that the digital signal processing means performs the feedback operational processing using digital data outputted from the analog-to-digital converting means one cycle earlier in a vertical synchronizing signal. With this configuration, a low speed A/D converter can be used as the analog-to-digital converting means, which contributes to reducing cost of the apparatus.

Further, a horizontal raster width controlling apparatus of this invention is so configured that the analog-to-digital signal converting means samples and holds the analog difference signal outputted from the analog difference signal producing means at a timing which is delayed by a half cycle of a vertical synchronizing signal. With this configuration, horizontal raster distortion correction is performed with the horizontal width of the center portion of the raster being constant.

BRIEF DESCRIPTION OF THE DRAWINGS

FIG. 10 shows waveforms of the signals inputted to or outputted from the comparator immediately after the power is turned on.

DETAILED DESCRIPTION OF THE PREFERRED EMBODIMENT

Figure 1:
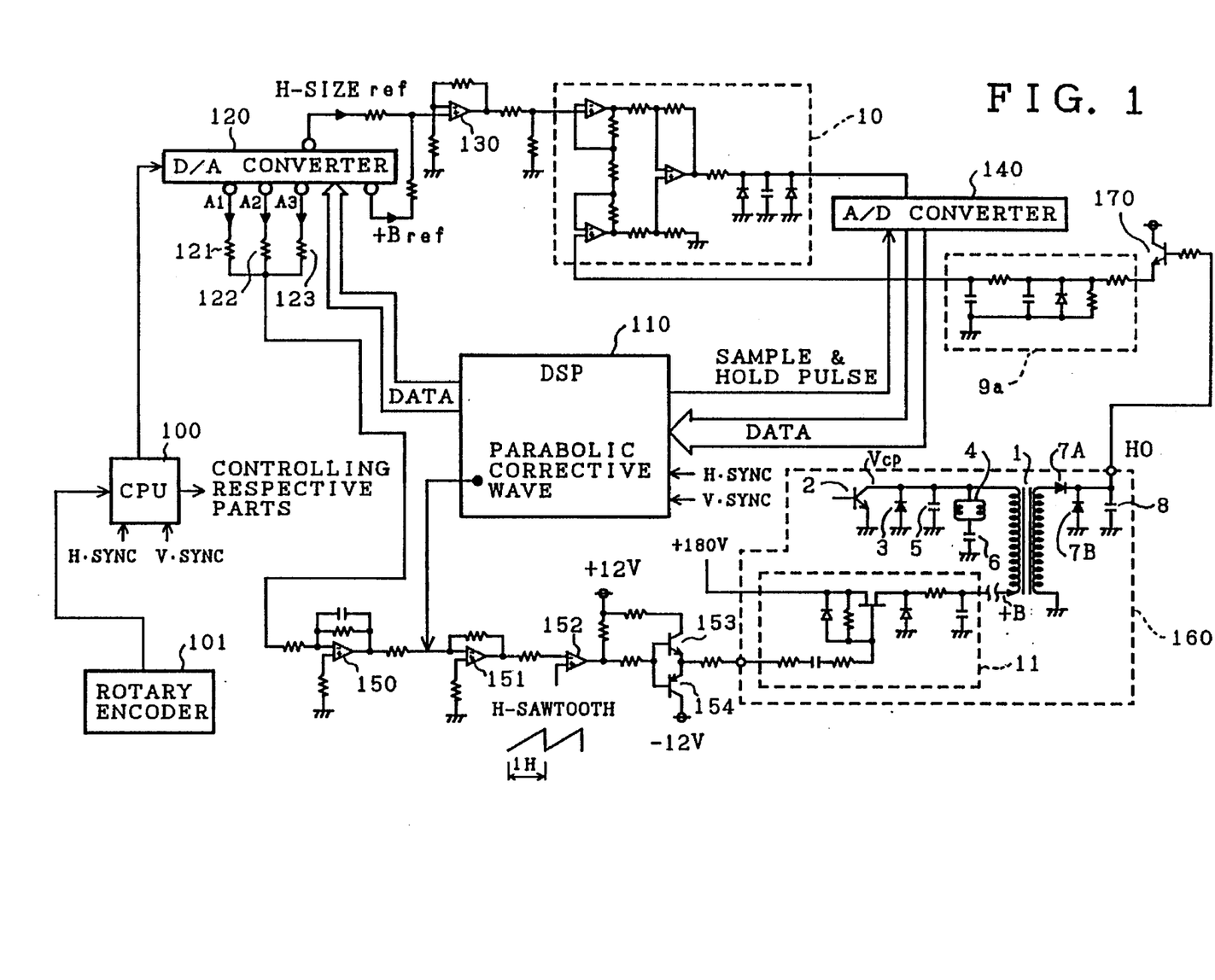
FIG. 1 is a block diagram showing a configuration of the horizontal raster width controlling apparatus according to embodiment of the present invention.

The preferred embodiments of the present invention will be explained with reference to the drawings. FIG. 1 is a block diagram showing a configuration of the horizontal raster width controlling apparatus of this invention. In FIG. 1, the same elements as in FIG. 16 are attached to the same reference numerals and the duplicate explanations are omitted. In FIG. 1, reference numeral 100 denotes a Central Processing Unit (CPU) which controlling respective parts of the horizontal raster width controlling apparatus, 101 denotes a rotary encoder for inputting raster width signal H-SIZE$_{ref}$ in the horizontal direction, 110 denotes a Digital Signal Processor (DSP) which performs feedback control of horizontal raster width and calculations of correction processing for horizontal raster width in each vertical cycle, 120 denotes a D/A converter which converts feedback control signal outputted from DSP 110 and digital horizontal raster width signal H-SIZE$_{ref}$ into analog signals, 130 denotes an adder which adds horizontal raster width signal H-SIZE$_{ref}$ outputted from D/A converter 120 and signal +B$_{ref}$ indicating value of voltage +B outputted from horizontal deflection voltage controlling device 11, 140 denotes an A/D converter which converts analog signal outputted from differential amplifier 10 into digital signal, 150 denotes an inverse adder which weights signals outputted from the terminals A1, A2 and A3, adds the weighted signals and inverts the added signal, 151 denotes an inverse adder which inverts parabolic corrective wave for pincushion distortion outputted from DSP 110 and adds the inverted corrective wave to the output signal of the inverse adder 150, 152 denotes a comparator which compares the output signal from the inverse adder 151 with the horizontal synchronizing sawtooth wave signal H-SAWTOOTH and outputs pulses based on a result of the comparison, 153 and 154 denote transistors constituting a buffer circuit which buffers the output of the comparator 152, 160 denotes a horizontal deflection circuit unit. Reference numerals 7A and 7B denote diodes for rectifying voltage produced at secondary winding of the horizontal output choke transformer 1. Reference numeral 170 denotes a transistor for buffering the voltage rectified by the diodes 7A and 7B as an emitter follower, 9a denotes a low pass filter through which only signals from emitter of the transistor 170 with a frequency lower than a predetermined frequency can pass. The output signals from the low pass filter 9a is inputted to the differential amplifier 10.

Horizontal raster width is in proportion to current I$_{DY}$ flowing through the deflection yoke 4 and the current I$_{DY}$ is in proportion to voltage +B outputted from the horizontal deflection voltage controlling device 11. Further, the current I$_{DY}$ is in inverse proportion to a horizontal synchronizing frequency. Furthermore, a collector pulse voltage V$_{CP}$ to be applied to the collector of the horizontal output transistor 2 is varied based on the current I$_{DY}$. Therefore, raster horizontal width can be controlled based on a voltage (first signal) obtained by rectifying the output of the secondary winding of the horizontal output transistor 2 because the rectified voltage reflects the collector pulse voltage V$_{CP}$. Thus, the output of the secondary winding of the horizontal choke transformer 1 is rectified by the diodes 7A and 7B and the rectified voltage is smoothed by the capacitor 8. The smoothed voltage is inputted to the transistor 170 where buffering is performed as an emitter-follower. The buffered voltage is inputted to one of the input terminals of the differential amplifier 10.

A desired horizontal raster width signal H-SIZE inputted by a user using the rotary encoder 101 is outputted from the D/A converter under the control of the CPU 100 as an analog horizontal raster width signal H-SIZE$_{ref}$. Further, the signal +B$_{ref}$ indicative of the output voltage +B from the horizontal deflection voltage control device 11 is also outputted from the D/A converter based on the horizontal synchronizing frequency. The horizontal raster width signal H-SIZE$_{ref}$ is added to the signal +B$_{ref}$ by the adder 130 and the resultant added signal makes a reference signal (second signal) for a horizontal raster width.

Figure 2:
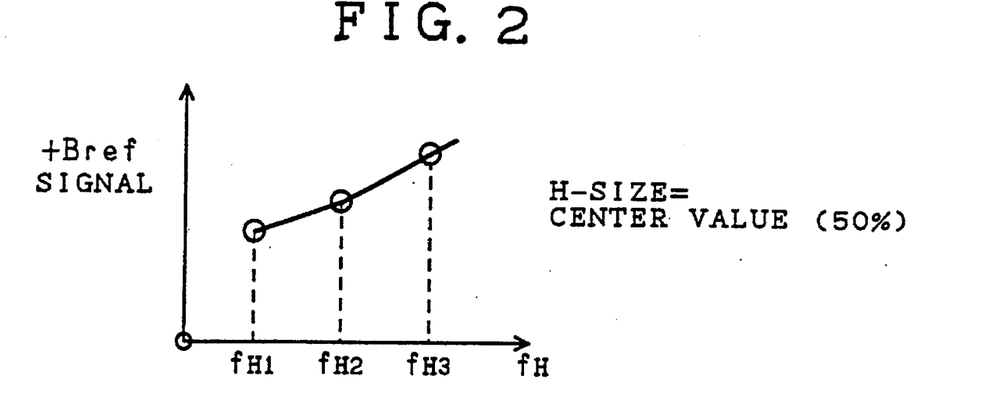
FIG. 2 is a graph showing the relationship between the signal $+B_{ref}$ indicating horizontal deflection voltage $+B$ and the horizontal synchronizing signal $f_H$.

FIG. 2 is a graph showing the relationship between the signal +B$_{ref}$ and the horizontal synchronizing signal f$_H$.

Figure 3:
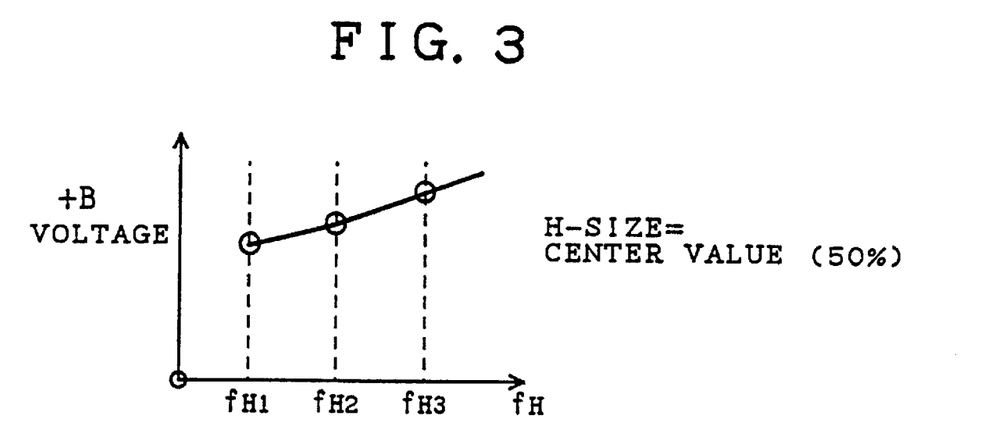
FIG. 3 is a graph showing the relationship between the voltage $+B$ and the horizontal synchronizing frequency $f_H$ when horizontal raster width which a user desires is of a center value.
Figure 4:
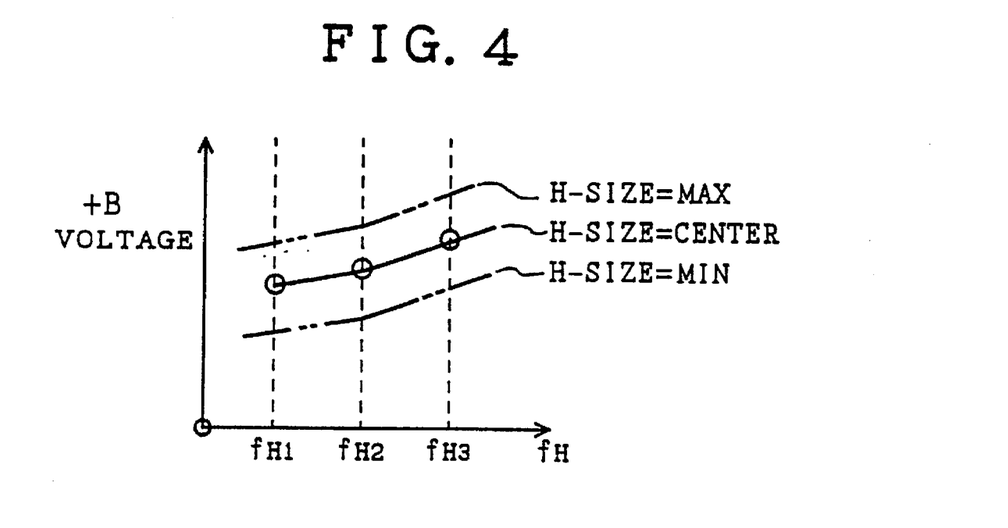
FIG. 4 is a graph showing the relationship between voltage $+B$ and horizontal synchronizing frequency $f_H$ when raster horizontal widths a user desires are of a minimum value, a center value and a maximum value, respectively.

FIG. 3 is a graph showing the relationship between the voltage +B and the horizontal synchronizing frequency f$_H$ in a case where the horizontal raster width which a user desires is of a center value. FIG. 4 is a graph showing the relationship between voltage +B and horizontal synchronizing frequency f$_H$ in a case where the raster horizontal widths a user desires are of a minimum value, a center value and a maximum value, respectively. As shown in FIGS. 2 and 3, the signal +B$_{ref}$ is so determined that a horizontal raster width is constant for the horizontal synchronizing frequencies f$_{H1}$, f$_{H2}$ and f$_{H3}$ in a case where a desired raster horizontal width H-SIZE is of a center value of the range in which the width H-SIZE can be varied. For the other frequencies, the corresponding signals +B$_{ref}$ are determined by using linear interpolation. These data are transferred to the D/A converter 120 from DSP 110 where the data are converted into an analog signals.

The output signal from the adder 130 is inputted to one of the input terminals of the differential amplifier 10. The output of the low pass filter 9a is inputted to the other input terminal. The difference signal between the signals inputted to the input terminals is amplified and outputted to the A/D converter 140 where the signal is converted into a digital signal. Namely, in the A/D converter 140, sampling, holding and A/D conversion are performed in response to clocks which are synchronized with vertical synchronizing signal V-SYNC which is inputted to the DSP 110 i.e., at a vertical synchronization timing. The digital signal outputted from the A/D converter 140 is inputted to the DSP 110 via the data line. When the specifications of the A/D converter 140 include 8-bit quantization and input voltage range from 0 to V$_{ref}$ (A/D converter reference voltage), A/D converter 140 is controlled by the DSP 110 such that digital output value of the A/D converter 140 becomes a center value "80H".

The control data in the DSP 110 are transferred to the D/A converter 120 via a serial transfer line. The control data are outputted from the analog output terminals A1, A2 and A3 having different resolutions respectively. Signals outputted from these terminals are weighted by the resistors 121, 122, 123 values of which are different from each other. The weighted signals are added and inverted by the inverse adder 150. Correction signal such as a parabolic wave signal outputted from the DSP 110 is added to the output signal of the inverse adder 150 and added signal is inverted by the inverse adder 151. The output signal of the inverse adder 151 and a saw tooth wave signal H-SAWTOOTH having a horizontal synchronizing period are inputted to the comparator 152 where the inputted signals are compared and a series of pulses having a width corresponding to a voltage level of the output signal of the inverse adder 151. The series of pulses are outputted via the buffer circuit consisting of the transistors 153, 154 to the horizontal deflection voltage controlling device 11 where direct current voltage 180 [V] is chopped so that appropriate controlled voltage +B is produced.

Figure 5:
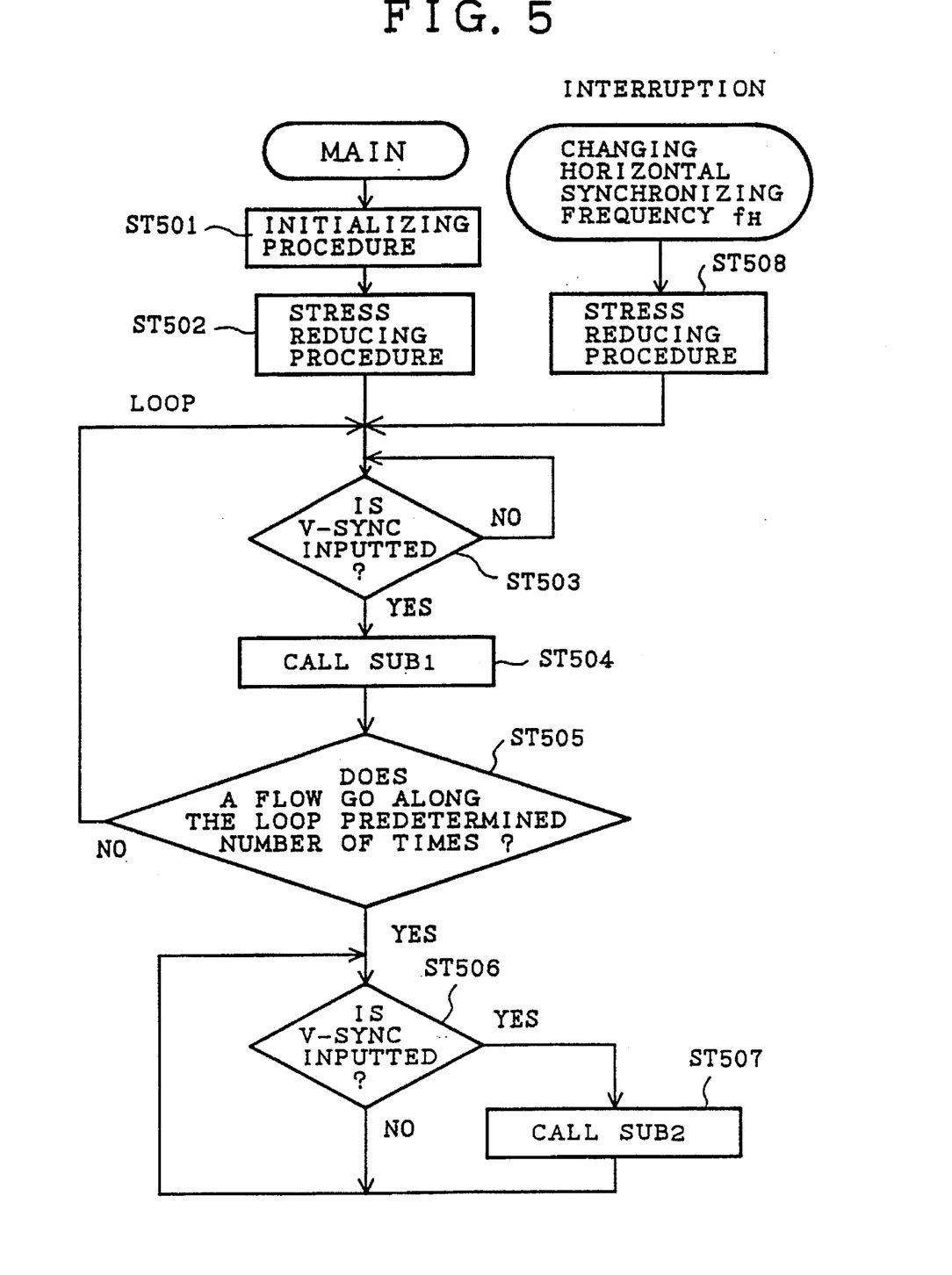
FIG. 5 is a flowchart showing a main routine of an algorithm for controlling raster horizontal width in DSP.

The horizontal raster width controlling apparatus will be explained by focusing on the operation of the DSP 110. FIG. 5 is a flowchart showing a main routine of an algorithm for controlling horizontal raster width in DSP 110. When the power of the display apparatus is on, initialization of DSP 110 such as clearing of built-in RAM area is performed (step ST501). Then, stress reducing processing is performed as follows (step ST502).

Figure 8:
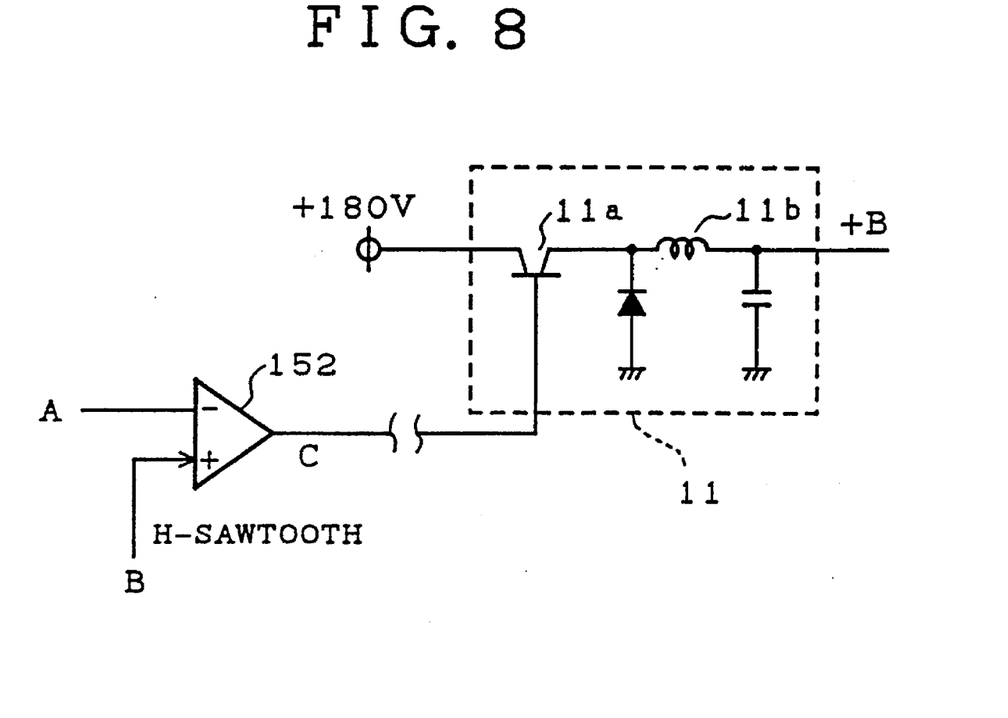
FIG. 8 is a circuit diagram of comparator and horizontal deflection voltage controlling device.
Figure 9:
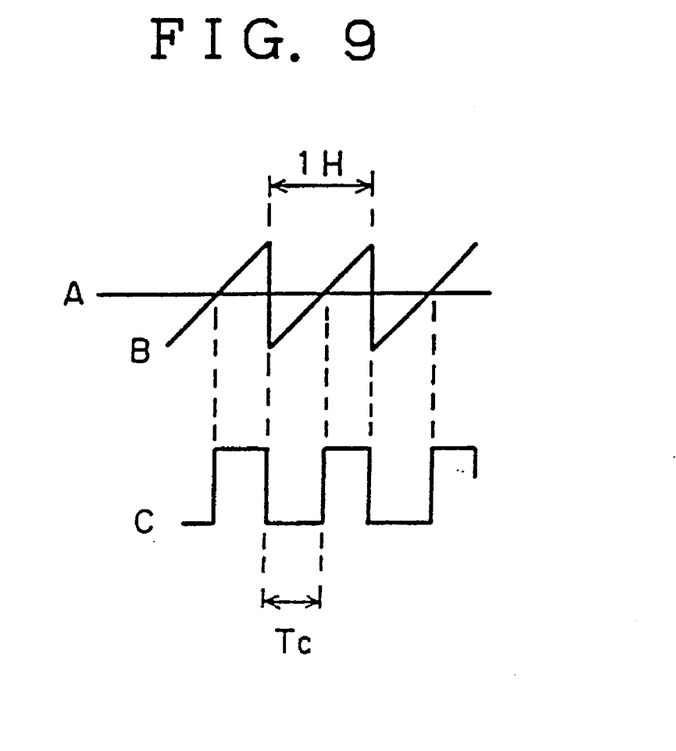
FIG. 9 shows waveforms of the signals inputted to or outputted from the comparator in a steady-state.
Figure 10:
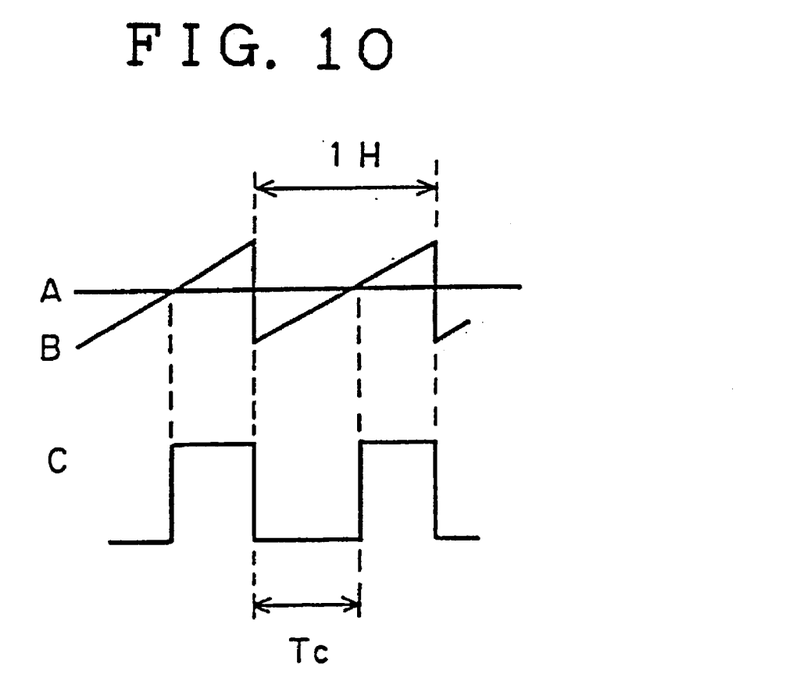

Immediately after the power is turned on, a cycle of the horizontal sawtooth wave signal H-SAWTOOTH to be inputted to the comparator 152 is not constant but random. Therefore, when a cycle of the sawtooth wave is very long, voltage +B becomes high thereby the voltage $V_{CP}$ to be applied to the collector of the horizontal output transistor becomes much higher than needed. Due to this higher voltage applied to the transistor, stress to the transistor is greatly increased. This phenomenon will be explained in detail with reference to FIGS. 8–10. FIG. 8 is a circuit diagram of comparator 152 and horizontal deflection voltage controlling device 11. FIG. 9 shows waveforms of the signals inputted to or outputted from the comparator 152 in a steady-state. FIG. 10 shows waveforms of the signals inputted to or outputted from the comparator 152 immediately after the power is turned on. When the cycle of the sawtooth B in a steady-state as depicted in FIG. 10 is longer than that of the sawtooth B as depicted in FIG. 9, the low period Tc outputted from the comparator 152 in FIG. 10 is longer than the low period Tc in a steady-state. During low period Tc, the switching element 11a including a transistor such as Field Effect Transistor (FET) is kept on, thereby energy is accumulated in the inductor 11b. Therefore, the longer the period Tc is, the higher the voltage +B becomes. A rise in voltage +B causes the collector voltage $V_{CP}$ to become high because the cycle of the sawtooth is the same as the cycle of driving of the horizontal output transistor 2 depicted in FIG. 1.

In view of the above phenomenon, the DSP 110 performs a controlling processing immediately after the power is turned on such that the output voltage A of the inverse adder 151 becomes under the minimum value of the sawtooth wave B to be inputted to the comparator 152. The initializing step ST501 is performed at a high speed so that it takes only a short time to shift to the processing of controlling the output voltage A because the DSP works very fast. As depicted in the graph of FIG. 2, the DSP 110 outputs such digital data to the D/A converter 120 that a voltage signal +$B_{ref}$ corresponding to the inputted horizontal synchronizing frequency is outputted from the D/A converter 120. After the CPU 100 measures a number of the pulses outputted from the rotary encoder 101, the CPU sends digital data corresponding to the measured number of pulses, thereby the horizontal raster width signal H-SIZE$_{ref}$ is outputted from the D/A converter 120.

Namely, during a period immediately after the power is turned on, intentionally a feedback control of raster width is not performed for a reference output, i.e., the output signal from adder 130. When the period elapses after the power is turned on, a feedback control, i.e., a control of making the signal outputted from the terminal HO of horizontal deflection unit 160 follow the reference signal outputted from the adder 130 begins. The period is predetermined by taking into consideration a time period within which a cycle of the sawtooth wave signal to be inputted to the comparator 152 becomes stable. The horizontal sawtooth wave signal H-SAWTOOTH is Generated based on the externally inputted horizontal synchronizing signal or on triggers of free-running frequency produced by an internal oscillator.

Next, a digital control of horizontal raster width control will be explained after the cycle of horizontal sawtooth wave signal H-SAWTOOTH becomes stable. The output voltage signal from the terminal A3 of the D/A converter 120 is used for offset voltage of output voltages from the terminals A1 and A2 thereby a speed of follow-up control of raster horizontal width is made higher. Output voltages from the terminals A1 and A2 are weighted by resistors 121 and 122, and weighted voltages are added by the inverse adder 150. A ratio of weighting by hardware should correspond to a ratio of weighing by software executed in the DSP 110, otherwise discontinuing points would exist thereby raster horizontal width would not be smoothly varied at the discontinuing points.

Each time the vertical synchronizing signal V-SYNC is inputted (step ST503), the subroutine SUB1 is called (step ST504). The steps of the subroutine SUB1 will be explained later in detail. After the subroutine SUB1 is called a predetermined number of times (step ST505), the subroutine SUB2 is repeatedly called (step ST507) each time the vertical synchronizing signal V-SYNC is inputted (step ST506).

When a change of horizontal synchronizing frequency $f_H$ is detected by an interruption and so forth, stress reducing processing is performed (step ST508) and the sequence flow shifts to the step ST503. The stress reducing processing at step ST508 will be explained later in detail.

Figure 6:
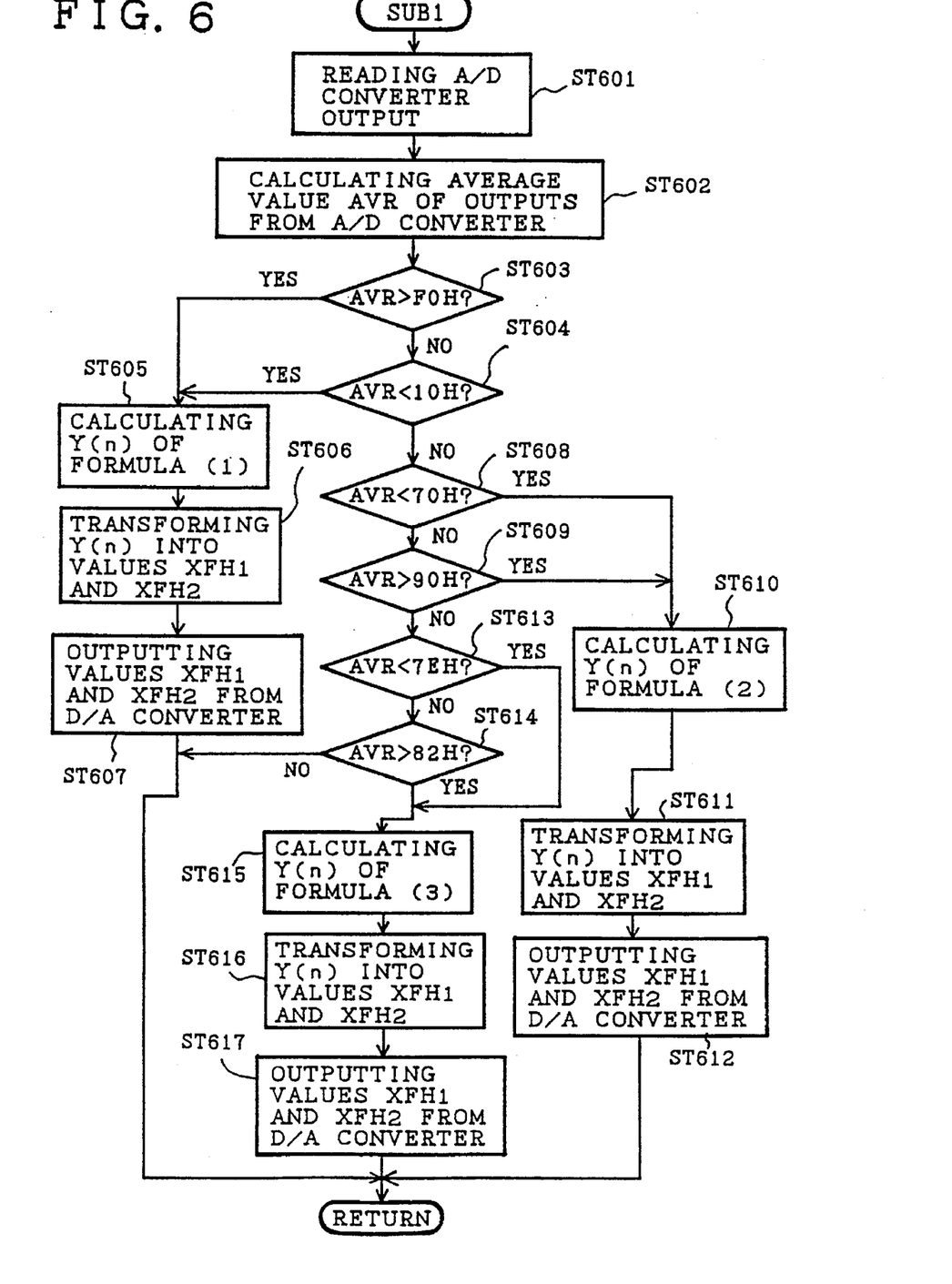
FIG. 6 is a flowchart showing the steps of the subroutine SUB1 of the horizontal raster width controlling.

Next, the subroutine SUB1 (first feedback operational processing) will be explained. FIG. 6 is a flowchart showing steps of the subroutine SUB1. A sampling and holding pulse is sent to the A/D converter 140 from the DSP 110 and difference analog signal between two signals inputted to the differential amplifier 10 is converted to an analog signal which is sent to the DSP 110 via a data line. The DSP 110 reads digital output values of A/D converter 140 (step ST601) and calculates an average value of a predetermined number of the digital output values, e.g., an average value AVR of each three digital output values (step ST602). Let Y(n) be the n-th added output from the terminals A1 and A2 of the A/D converter 120. Thus, if the present added output value is Y(n), the last added output value is Y(n–1) and the last added output value but one is Y(n–2).

When the difference between the average value AVR of a predetermined number of digital outputs from the A/D converter 140 and raster width feedback value is very large, i.e., when AVR>"F0H" or AVR<"10H" (steps ST603 and ST604), Y(n) is calculated by using the formula (1) (step ST605).

$$Y(n)=Y(n-1)-K1\cdot(Y(n-1)-Y(n-2))-K2\cdot f_H\cdot(AVR-\text{``80H''}) \quad (1)$$

Subsequently to the step ST605, the value Y(n) is transformed into the two values XFH1 and XFH2 (step ST606) and the signals corresponding to the values XFH1 and XFH2 are outputted from the terminals A1 and A2 of the D/A converter 120 (step ST607).

Similarly to the above, when the difference between the average value AVR and the raster width feedback value is middle, i.e., when "10H"≦AVR<"70H" or "90H"<AVR≦"F0H" (steps ST603, ST604, ST608 and ST609), Y(n) is calculated by using the following formula (2) (step ST610).

$$Y(n)=Y(n-1)-K3\cdot(Y(n-1)-Y(n-2))-K4\cdot f_H\cdot(AVR-\text{``80H''}) \quad (2)$$

Subsequently to the step ST610, the value Y(n) is transformed into the two values XFH1 and XFH2 (step ST611) and the signals corresponding to the values XFH1 and XFH2 are outputted from the terminals A1 and A2 of the D/A converter 120 (step ST612).

When the control system is almost in a state of convergence, i.e., when "70H"≦AVR<"7EH" or "82H"<AVR≦"90H" (steps ST603, ST604, ST608, ST609, ST613 and ST614), the value Y(n) is calculated by using the following formula (3) (step ST615).

$$Y(n)=Y(n-1)-K5\cdot(AVR-\text{``80H''}) \quad (3)$$

Subsequently to the step ST615, the value Y(n) is transformed into the two values XFH1 and XFH2 (step ST616) and the signals corresponding to the values XFH1 and XFH2 are outputted from the terminals A1 and A2 of the D/A converter 120 (step ST617).

On the other hand, when the control system is in a state of convergence, i.e., when "7EH"≦AVR≦"82H" (steps ST603, ST604, ST608, ST609, ST613 and ST614), the sequence flow returns to the main routine without performing a feedback control.

Figure 7:
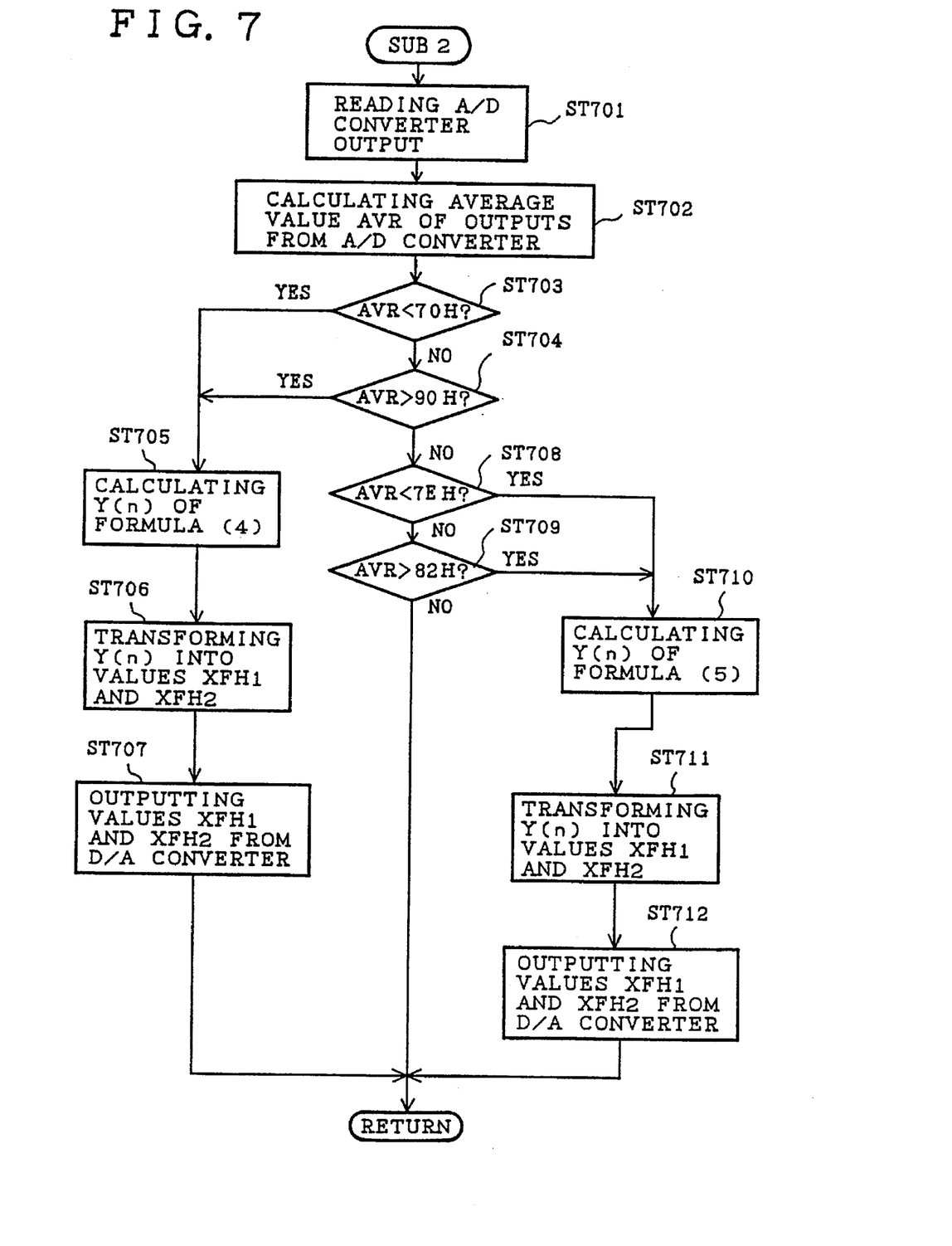
FIG. 7 is a flowchart showing the steps of the subroutine SUB2 of the horizontal raster width controlling.

Next, the steps of the subroutine SUB2 (second feedback operational processing) will be explained. FIG. 7 is a flowchart showing the steps of the subroutine SUB2. Similarly to the subroutine SUB1, DSP 110 reads the digital data outputted from the A/D converter 140 (step ST701) and calculates the average value AVR of the digital data outputted from the A/D converter 140 (step ST702).

When the difference between the average value AVR of a predetermined number of digital outputs from the A/D converter 140 and raster width feedback value is very large, i.e., when AVR<"70H" or AVR>"90H" (steps ST703 and ST704), Y(n) is calculated by using the following formula (4) (step ST705 ).

$$Y(n)=Y(n-1)-K6\cdot(Y(n-1)-Y(n-2))-K7\cdot f_H\cdot(AVR-\text{``80H''}) \quad (4)$$

Subsequently to the step ST710, the value Y(n) is transformed into the two values XFH1 and XFH2 (step ST706) and the signals corresponding to the values XFH1 and XFH2 are outputted from the terminals A1 and A2 of the D/A converter 120 (step ST707).

When the control system is almost in a state of convergence, i.e., when "70H"≦AVR<"7EH" or "82H"<AVR≦"90H" (steps ST703, ST704, ST708 and ST709), the value Y(n) is calculated by using the following formula (5) (step ST710).

$$Y(n)=Y(n-1)-K8\cdot f_H\cdot(AVR-\text{``80H''}) \quad (5)$$

Subsequently to the step ST705, the value Y(n) is transformed into the two values XFH1 and XFH2 (step ST711) and the signals corresponding to the values XFH1 and XFH2 are outputted from the terminals A1 and A2 of the D/A converter 120 (step ST712).

On the other hand, when the controlling system is in a state of convergence, i.e., when "7EH"≦AVR≦"82H" (steps ST703, ST704, ST708 and ST709), the sequence returns to the main routine without performing a feedback control.

A speed and stability of the controlling system are determined based on the values of the coefficients K1 to K8 in the formulae (1) to (5). A loop gain of a loop in which the subroutine SUB1 is performed is set high by selecting appropriate values of the coefficients K1 to K5. On the other hand, a loop gain of a loop in which the subroutine SUB2 is performed is set lower than the loop gain for the subroutine SUB1 by selecting appropriate values of the coefficients K6 to K8. Further, as indicated in the flowchart of FIG. 5, it is predetermined how many times the subroutine SUB1 is repeated in order to prevent raster width to be displayed from oscillating because the loop gain for the subroutine SUB1 is set high.

More specifically, in the formulae (1), (2) and (4), the smaller the values of coefficients K1, K3 and K6 are, the higher the loop gain becomes and the larger the values of coefficients K2, K4 and K7 are, the higher the loop gain becomes. In formulae (3) and (5), the larger the values of coefficients K5 and K8, the higher the loop gain becomes.

Furthermore, in the subroutine SUB1, the values of the coefficients are set such that each of the controlling speeds is lower in the order of formulae (1), (2) and (3). On the other hand, in the subroutine SUB2, the values of the coefficients are set such that each of the controlling speeds is lower in the order of formulae (4) and (5).

Formulae (1), (2) and (4) employ horizontal synchronizing frequency $f_H$ as a parameter such that a loop gain becomes higher as the horizontal synchronizing frequency increases. The A/D Converter 140 and the D/A converter 120 operates with a 5 volt single power source and has 8 bit quantization. The controlling system of this embodiment adopts a digital value of "80H" outputted from the A/D converter 140 as a value of convergence.

Output voltages from the terminals A1 and A2 of the D/A converter 120 are weighted by using the following formula and weighted voltages are referred to XFH1 and XFH2 respectively.

$$Y(n)=XFH1+64\cdot XFH2$$

In this formula, the resolution ratio between voltages from the output terminals A1 and A2 is set to be a ratio of 1 to 64. However, other ratios can be used as long as a resolution ratio set in the software executed in the DSP 110 corresponds to a resolution ratio from the output terminals A1 and A2 in hardware.

Figure 12:
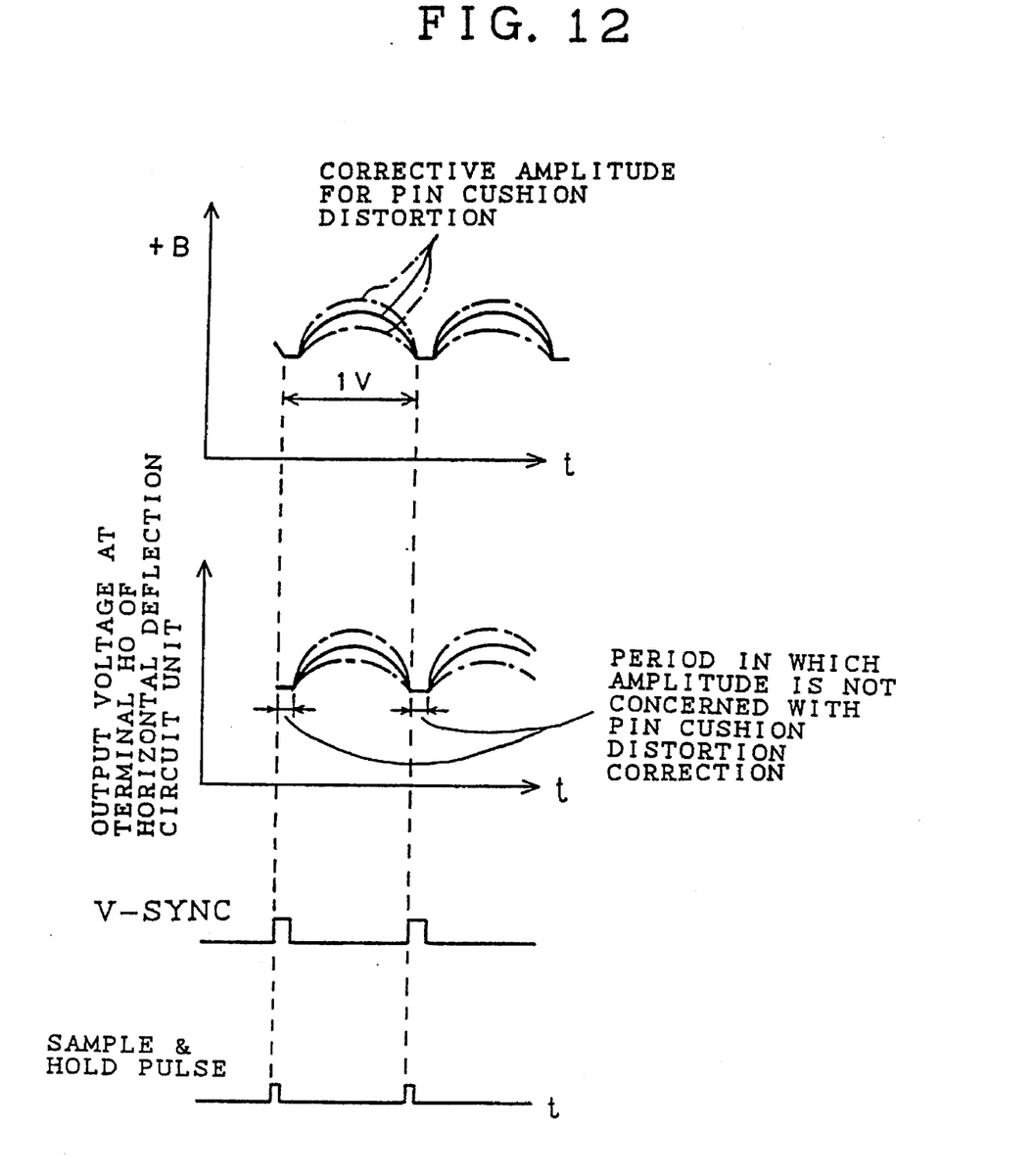
FIG. 12 shows a horizontal deflection voltage, voltage outputted from the outputting terminal of the horizontal deflection circuit unit, vertical synchronizing signal, sampling and holding pulses for the A/D converter in a case where pincushion distortion correction is performed.
Figure 13:
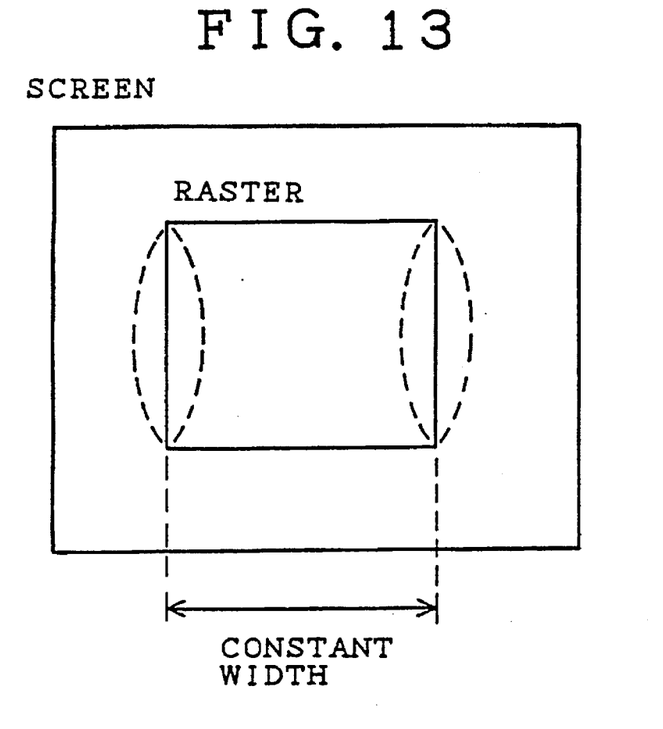
FIG. 13 shows a raster and pincushion correction in a case where sampling and holding of the A/D converter is performed at a timing of vertical synchronizing signal.

As explained above, sampling, holding and A/D conversion of the A/D converter 140 are performed at a timing of horizontal synchronizing signal V-SYNC. Therefore, as shown in FIG. 12, even if the voltage +B is modulated by right and left side pincushion corrective signal, the feedback control is performed during a period in which the voltage is not affected by the pincushion corrective signal. Therefore, feedback control can be performed without being affected by pincushion correction. In this embodiment, left and right side pincushion correction is performed such that the positions of the four vertices of the raster area are constant as shown in FIG. 13. When the apparatus is configured such that DSP 110 fetches digital data outputted from the A/D converter 140 in the preceding cycle, It is possible to employ low speed conversion elements in the A/D converter 140, which contributes to reducing the cost of A/D converter 140.

Figure 14:
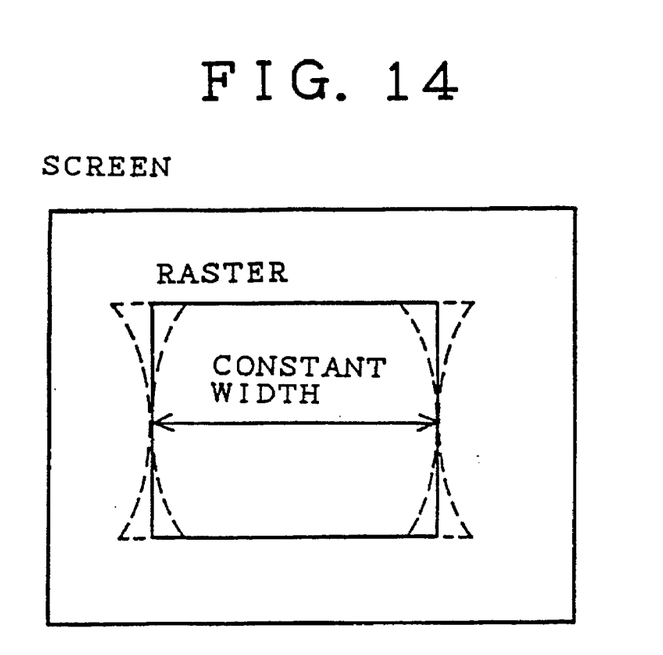
FIG. 14 shows a raster and pincushion correction in a case where sampling and holding of the A/D converter is performed at a timing which is delayed by a half cycle of a vertical synchronizing signal.

When the sampling and holding of the A/D converter 140 are performed at the middle of two vertical synchronizing signals V-SYNC, i.e., when it is performed after ½ vertical period of time elapses, the left and right side pincushion correction is performed such that horizontal width of the center portion of the raster is constant as shown in FIG. 14.

The loop gain of the subroutine SUB2 is set lower than that of subroutine SUB1 by adopting the values of the coefficients in formulae (4) and (5) different from those of subroutine SUB1. In addition to this control, stability of the controlling system can be changed by using a way of partitioning a range of average value AVR different from that in the subroutine SUB1 for utilizing respective formulae.

Figure 11:
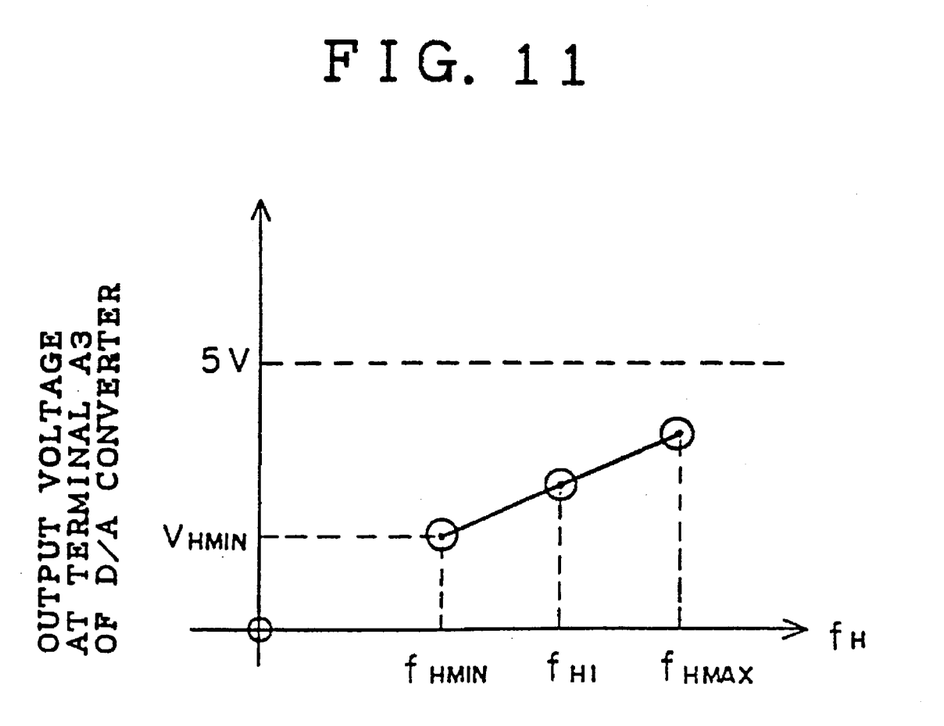
FIG. 11 is a graph showing the relationship between the output voltage from the D/A converter and horizontal synchronizing frequency.

Next, the stress reducing processing of step ST508 will be explained. When the horizontal synchronizing frequency $f_H$ is changed, the output voltage outputted from the output terminal A3 is kept minimum during a period from a detection of a frequency change until the horizontal synchronizing frequency $f_H$ becomes in a steady state, or during a period from recognition of switching of horizontal frequency $f_H$ until a predetermined time elapses in order to reduce stress which might otherwise be imposed to the horizontal output transistor. For example, in FIG. 11, when the horizontal synchronizing frequency $f_H$ is changed from a horizontal synchronizing frequency $f_{HMAX}$ to a horizontal synchronizing frequency $f_{H1}$, the voltage $V_{HMIN}$ corresponding to minimum horizontal synchronizing frequency $f_{HMIN}$ is outputted from the output terminal A3 of the D/A converter 120 until the horizontal synchronizing frequency becomes stable to frequency $f_{H1}$ or until a predetermined time elapses after frequency change is recognized.

Figure 15:
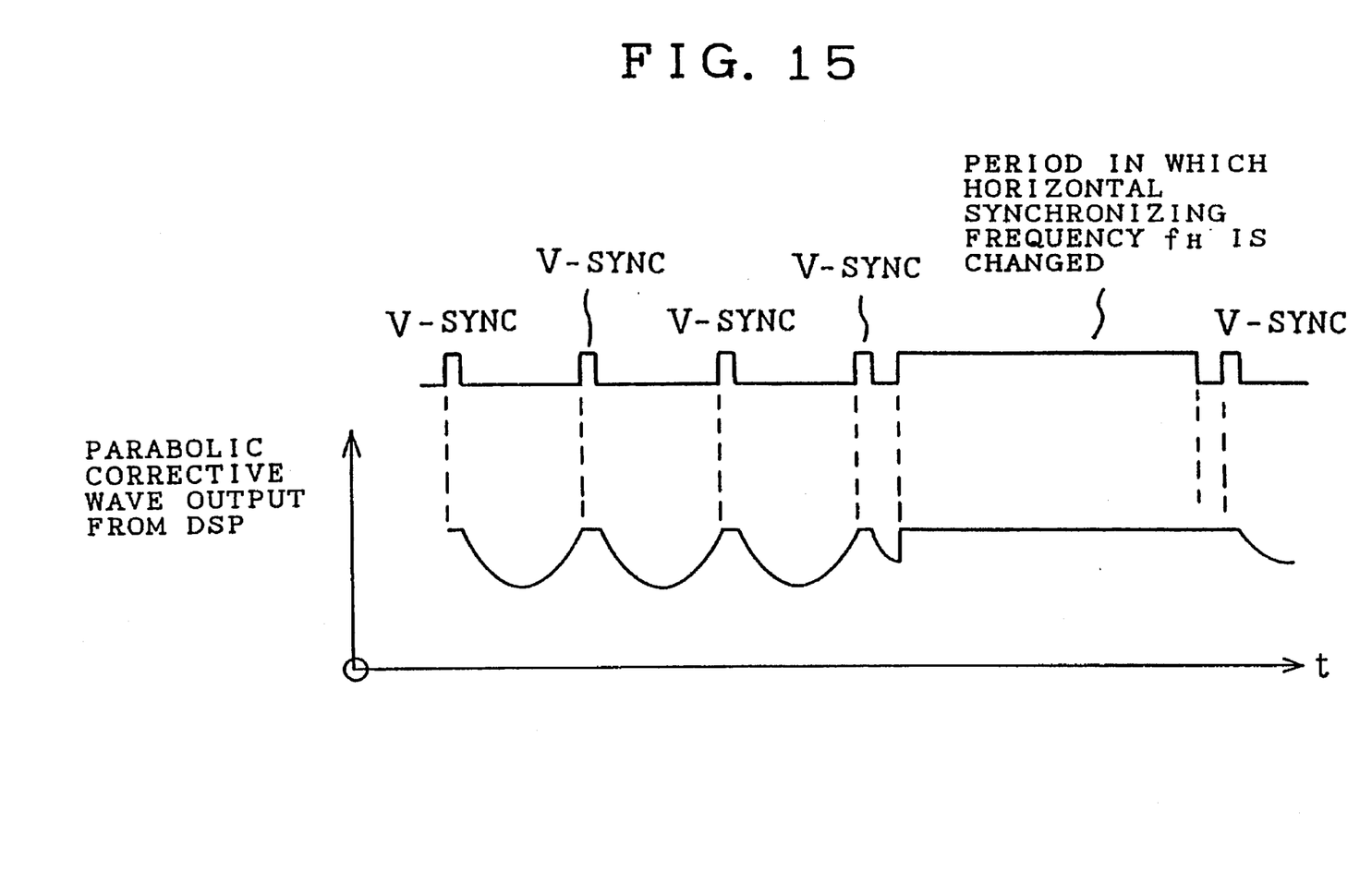
FIG. 15 is a graph showing a parabolic corrective wave signal outputted from the DSP and a voltage outputted from the DSP when the frequency is changed.

Furthermore, in order to reduce stress when the horizontal synchronizing frequency $f_H$ is changed, parabolic corrective wave which is to be outputted from DSP 110 is changed into a constant voltage signal. As depicted in FIG. 15, the DSP 110 outputs as high voltage as possible in a period of changing horizontal synchronizing frequency $f_H$ without producing a distortion corrective wave because it is unnecessary to calculate a horizontal raster distortion corrective wave and to output it in the period of changing horizontal synchronizing frequency $f_H$. This causes the inverse adder 151 to output lower voltage thereby stress to the horizontal output transistor 2 is reduced.

In the above embodiments, parabolic corrective wave is generated independently in the DSP 110 and is added to the analog output of the D/A converter 120. However, when a high precision D/A converter is used as D/A converter 140, it is possible to perform parabolic correction digitally in the DSP 110, to send the parabolically corrected digital data to the D/A converter 120 and to output parabolically corrected analog data from the D/A converter 120.

What is claimed is:

1. A horizontal raster horizontal width controlling apparatus which controls a width of a raster displayed on a screen of a cathode ray tube, comprising:

a deflection yoke for deflecting an electron beam emitted from the cathode ray tube;

horizontal deflection voltage controlling means for controlling an input power voltage to be applied to the deflection yoke based on an input control signal and for outputting the power voltage;

a horizontal output transistor for applying a voltage to the deflection yoke based on the power voltage outputted from the horizontal deflection voltage controlling means at a timing of a horizontal synchronizing signal;

voltage measuring means for measuring a first signal corresponding to a collector pulse to be applied to the horizontal output transistor and for outputting the first signal;

means for producing an analog difference signal indicating a difference between the first signal and a second signal indicating a desired horizontal width of the raster;

analog-to-digital converting means for converting the analog difference signal into a digital difference signal;

digital processing means for inputting the digital difference signal, for performing a feedback operational processing so as to control a horizontal width of the raster based on the digital difference signal, and for outputting a digital resultant signal indicating a result of the feedback operational processing;

digital-to-analog converting means for converting the digital resultant signal into an analog resultant signal; and voltage control signal generating means for generating the control signal based on the analog resultant signal and for outputting the control signal to the horizontal deflection voltage controlling means.

2. A horizontal raster width controlling apparatus according to claim 1, wherein the analog-to-digital signal converting means samples and holds the analog difference signal at a timing of a vertical synchronizing signal.

3. A horizontal raster width controlling apparatus according to claim 2, the horizontal raster width controlling apparatus further comprising:

raster width inputting means for inputting a desired horizontal raster width; and raster width signal generating means for generating the second signal based on the inputted desired horizontal raster width.

4. A horizontal raster width controlling apparatus according to claim 1, wherein the digital signal processing means performs the feedback operational processing such that the digital difference outputted from the analog-to-digital converting means settles into a predetermined digital convergence value when the feedback operational processing is in a state of convergence.

5. A horizontal raster width controlling apparatus according to claim 2, wherein the digital signal processing means performs the feedback operational processing such that the digital difference outputted from the analog-to-digital converting means settles into a predetermined digital convergence value when the feedback operational processing is in a state of convergence.

6. A horizontal raster width controlling apparatus according to claim 3, wherein the digital signal processing means performs the feedback operational processing such that the digital difference outputted from the analog-to-digital converting means settles into a predetermined digital convergence value when the feedback operational processing is in a state of convergence.

7. A horizontal raster width controlling apparatus according to claim 4, wherein the digital signal processing means performs a first feedback operational processing a predetermined number of times immediately after the apparatus is turned on, and thereafter the digital signal processing means performs a second operational processing repeatedly, a control speed of the first feedback operational processing being higher than a control speed of the second feedback operational processing.

8. A horizontal raster width controlling apparatus according to claim 5, wherein the digital signal processing means performs a first feedback operational processing a predetermined number of times immediately after the apparatus is turned on, and thereafter the digital signal processing means performs a second operational processing repeatedly, a control speed of the first feedback operational processing being higher than a control speed of the second feedback operational processing.

9. A horizontal raster width controlling apparatus according to claim 6, wherein the digital signal processing means performs a first feedback operational processing a predetermined number of times immediately after the apparatus is turned on, and thereafter the digital signal processing means performs a second operational processing repeatedly, a control speed of the first feedback operational processing being higher than a control speed of the second feedback operational processing.

10. A horizontal raster width controlling apparatus according to claim 7, wherein in the first feedback operational processing, an overall possible range of values of the digital difference signal outputted from the analog-to-digital converting means is divided into a plurality of sub-ranges on a basis of the digital convergence value and wherein the digital signal processing means performs a first feedback operational processing a controlling speed of which is dependent on a sub-range in which a value of the digital difference signal is included.

11. A horizontal raster width controlling apparatus according to claim 8, wherein in the first feedback operational processing, an overall possible range of values of the digital difference signal outputted from the analog-to-digital converting means is divided into a plurality of sub-ranges on a basis of the digital convergence value and wherein the digital signal processing means performs a first feedback operational processing a controlling speed of which is dependent on a sub-range in which a value of the digital difference signal is included.

12. A horizontal raster width controlling apparatus according to claim 9, wherein in the first feedback operational processing an overall possible range of values of the digital difference signal outputted from the analog-to-digital converting means is divided into a plurality of sub-ranges on a basis of the digital convergence value and wherein the digital signal processing means performs a first feedback operational processing a controlling speed of which is dependent on a sub-range in which a value of the digital difference signal is included.

13. A horizontal raster width controlling apparatus according to claim 1, further comprising corrective wave signal generating means for generating a corrective wave signal for correcting horizontal raster widths in each vertical period and signal adding means for adding the corrective wave signal to the analog resultant signal outputted from the digital-to-analog converting means, wherein the voltage controlling signal generating means generates the control signal for controlling the power voltage based on a signal outputted from the signal adding means and outputs the control signal to horizontal deflection voltage controlling means.

14. A horizontal raster width controlling apparatus according to claim 12, further comprising corrective wave signal generating means for generating a corrective wave signal for correcting horizontal raster widths in each vertical period and signal adding means for adding the corrective wave signal to the analog resultant signal outputted from the digital-to-analog converting means, wherein the voltage controlling signal generating means generates the control signal for controlling the power voltage based on a signal outputted from the signal adding means and outputs the control signal to horizontal deflection voltage controlling means.

15. A horizontal raster width controlling apparatus according to claim 13, wherein the corrective wave signal generating means stops generating the corrective wave signal immediately after a horizontal synchronizing frequency is changed and outputs a predetermined constant voltage signal instead of the corrective wave signal such that a voltage value outputted from the horizontal deflection voltage controlling means becomes lower.

16. A horizontal raster width controlling apparatus according to claim 1, wherein the digital signal processing means outputs such digital data to the digital-to-analog converting means that a voltage value outputted from the horizontal deflection voltage controlling means becomes lower for a predetermined period of time after the apparatus is turned on or after a horizontal synchronizing frequency is changed.

17. A horizontal raster width controlling apparatus according to claim 15, wherein the digital signal processing means outputs such digital data to the digital-to-analog converting means that a voltage value outputted from the horizontal deflection voltage controlling means becomes lower for a predetermined period of time after the apparatus is turned on or after a horizontal synchronizing frequency is changed.

18. A horizontal raster width controlling apparatus according to claim 1, wherein the feedback operational processing includes a horizontal synchronizing frequency as a parameter such that a control change due to a horizontal synchronizing frequency difference is absorbed.

19. A horizontal raster width controlling apparatus according to claim 17, wherein the feedback operational processing includes a horizontal synchronizing frequency as a parameter such that a control change due to a horizontal synchronizing frequency difference is absorbed.

20. A horizontal raster width controlling apparatus according to claim 2, wherein the digital signal processing means performs the feedback operational processing using digital data outputted from the analog-to-digital converting means during an immediately prior cycle of a vertical synchronizing signal.

21. A horizontal raster width controlling apparatus according to claim 1, wherein the analog-to-digital signal converting means samples and holds the analog different signal outputted from the analog difference signal producing means at a timing which is delayed by a half cycle of a vertical synchronizing signal.

* * * * *